US006128805A

United States Patent [19]

Rivera

[11] Patent Number: 6,128,805

[45] Date of Patent: Oct. 10, 2000

[54] MULTIPURPOSE FOLDING TOOL HANDLE

[75] Inventor: Benjamin C. Rivera, West Linn, Oreg.

[73] Assignee: Leatherman Tool Group, Inc., Portland, Oreg.

[21] Appl. No.: 09/481,997

[22] Filed: Jan. 11, 2000

Related U.S. Application Data

[62] Division of application No. 08/961,055, Oct. 30, 1997, Pat. No. 6,014,787.

[51] Int. Cl.[7] .......... A47J 45/00

[52] U.S. Cl. .......... 16/111.1; 7/128; 30/152; 16/110.1

[58] Field of Search .......... 16/111.1, 110.1, 16/436; 7/125, 128; 30/123, 143, 152, 161; 81/177.1, 489

[56] References Cited

U.S. PATENT DOCUMENTS

| | | | |
|---|---|---|---|
| 237,138 | 2/1881 | Slayton . | |
| 239,068 | 3/1881 | Slayton | 30/143 |
| D. 286,501 | 11/1986 | Magan | D8/105 |
| D. 373,521 | 9/1996 | Applegate et al. | D8/99 |
| 580,235 | 4/1897 | Strum . | |
| 825,093 | 7/1906 | Watson . | |
| 2,798,290 | 7/1957 | Bassett | 30/152 |
| 4,238,862 | 12/1980 | Leatherman | 7/128 |
| 4,744,272 | 5/1988 | Leatherman | 81/427.5 |
| 4,888,869 | 12/1989 | Leatherman | 30/152 X |
| 4,961,239 | 10/1990 | Boyd, Sr. et al. | 7/118 |
| 5,062,173 | 11/1991 | Collins et al. | 7/118 |
| 5,111,581 | 5/1992 | Collins | 30/161 |
| 5,142,721 | 9/1992 | Sessions et al. | 7/128 |
| 5,212,844 | 5/1993 | Sessions et al. | 7/128 |
| 5,280,659 | 1/1994 | Park | 7/128 |
| 5,491,856 | 2/1996 | Legg | 7/128 |
| 5,497,522 | 3/1996 | Chen | 7/128 |
| 5,511,310 | 4/1996 | Sessions et al. | 30/161 |
| 5,537,750 | 7/1996 | Seber et al. | 30/161 |
| 5,697,114 | 12/1997 | McIntosh et al. | 7/129 |
| 5,745,997 | 5/1998 | Berg et al. | 7/128 X |
| 5,755,035 | 5/1998 | Weatherly | 30/161 |
| 5,765,247 | 6/1998 | Seber et al. | 7/128 |
| 6,006,385 | 12/1999 | Kershaw et al. | 7/129 |

*Primary Examiner*—Chuck Y. Mah

*Attorney, Agent, or Firm*—Chernoff, Vilhauer, McClung & Stenzel, LLP

[57] ABSTRACT

A multipurpose hand tool with folding handles each including a central channel to receive pliers jaws or the like when the tool is folded, and including troughs holding outer blades alongside the central channel so that the outer blades can be opened without unfolding the tool. The troughs face opposite the direction of the central channels, and the bases of the outer troughs act as comfortable places to grip the handles when they are extended for use of the pliers. Blade locking mechanisms are incorporated in the walls of the central channels to lock each of the outer blades in an extended position.

12 Claims, 7 Drawing Sheets

MULTIPURPOSE FOLDING TOOL HANDLE

This application is a division of U.S. patent application Ser. No. 08/961,055, filed Oct. 30, 1997, now U.S. Pat. No. 6,014,787.

BACKGROUND OF THE INVENTION

The present invention relates to multipurpose hand tools, and in particular relates to such a tool having channel shaped handles which may be folded with respect to each other and other parts of the tool, providing a compact nested tool which permits certain blades to be opened into extended positions without unfolding the handles.

Applicant's assignee is the manufacturer of folding multipurpose tools similar to the tools disclosed in Leatherman U.S. Pat. No. 4,238,862 and Leatherman U.S. Pat. No. 4,744,272, as well as those described in U.S. Pat. Nos. 5,745,997 and 5,743,582. All of the above-mentioned tools manufactured by applicant's assignee include handles having the form of generally U-shaped channels. These handles fold around the bases of respective ones of a pair of pivotally interconnected jaws, thus housing the jaws within the channels, placing the tool in a compact form so it can be carried easily on one's person. Tool blades or bits, such as knife blades, screwdriver bits, and can openers, can also be stowed within the channel-shaped handles, and selected ones of these blades and bits can be extended individually for use. Extending a selected one of such blades or bits, however, requires that the handles be spread apart from one another while the selected blade is pivoted from its stowed position within the channel to its extended position. Thereafter, the handles should be replaced alongside each other to serve best as a handle for the selected blade.

When the pliers or other pivoted-jaw or pivoted-blade tool is used the handles are extended with respect to the bases of the pivotally interconnected jaws or blades. In this configuration the channels face openly outward, away from each other, with the channel bottoms of the handles facing toward each other. Depending upon the thickness of the material of which the channels are formed, the edges of the channel walls, thus facing outwardly, may be uncomfortable to one's hand when the handles are squeezed together during use of the pliers or similar tool.

While in some similar tools narrow strips along the edges of the channel walls have been folded inward to lie tightly alongside the walls and present a folded margin, this gives only a slight improvement in comfort and adds to the cost of manufacture.

It is desirable in a multipurpose folding tool for a blade or tool bit, particularly a knife blade, not to be able to fold unintentionally with respect to its handle during use. While springs and cams have been used previously to keep a selected blade or tool bit of a multipurpose folding tool in its extended position of use, it is desired to have a more positive way to keep such a blade or tool bit extended during use.

It is also desired to be able easily to open a selected one of a group of most commonly used blades. In some cases it is desirable to open such a blade without having to use more than one hand.

Not only should a multipurpose tool be capable of performing several different functions, the tool should be capable of being manufactured at a reasonable cost without sacrificing quality, as evidenced, for example, by smooth movement of individual blades between stowed and extended positions, and by reliable retention of blades in their operative positions during use.

What is desired, then, is an improved multipurpose folding tool offering easy access to certain blades and comfortable use of tools with a pair of pivotally interconnected jaws, such as pliers or shears, yet which is able to be manufactured with reliably high quality at a moderate cost.

SUMMARY OF THE INVENTION

The present invention overcomes the previously mentioned shortcomings of the prior art and answers the aforesaid needs by providing a multipurpose folding tool including handles which are more comfortable than those of previous tools of the same general type. Such handles each hold at least one blade available to be moved between respective stowed and extended positions while the tool remains with its handles undisturbed in a folded configuration with a pair of pivotally interconnected jaws housed between the handles.

In a preferred embodiment of the invention each handle includes a central channel and a pair of side troughs, one on each side of the central channel, and facing oppositely from the central channel, so that the side troughs face openly apart from each other when the tool is in its folded configuration in which the central channel contains the pivotally interconnected pair of jaws.

In a preferred embodiment of the invention an outer surface of a base of each of the side troughs is disposed outwardly in position to be grasped by a user's hand when the handles of the tool are extended with respect to the interconnected pliers jaws or the like for the use of those jaws.

In one embodiment of the invention a main member of each of the handles is made by cutting a blank from a single sheet of material and bending it to a required shape, to define both the central channel and the side troughs.

In one embodiment of the invention a pair of blade locking members are defined respectively in the opposite sidewalls of the central channel, to lock in extended positions blades normally housed in the side troughs.

In a preferred embodiment of the invention outer tool blades which can be housed in the side troughs of the handle are attached to the handle on pivot shafts on which axial bearing members retain each outer tool blade independently of the portions of the handle defining the side troughs.

It is a significant feature of a tool which is one embodiment of the invention that each outer blade that can be housed in a side trough of the handle mentioned above includes a laterally extending portion which cooperates with the handle to support such a blade in its extended position and cooperates also with a locking member defined in a sidewall of a central channel of the handle to limit movement of such a blade in its stowed position.

The foregoing and other objectives, features, and advantages of the invention will be more readily understood upon consideration of the following detailed description of the invention, taken in conjunction with the accompanying drawings.

DETAILED DESCRIPTION OF THE PREFERRED EMBODIMENTS

Figure 1:
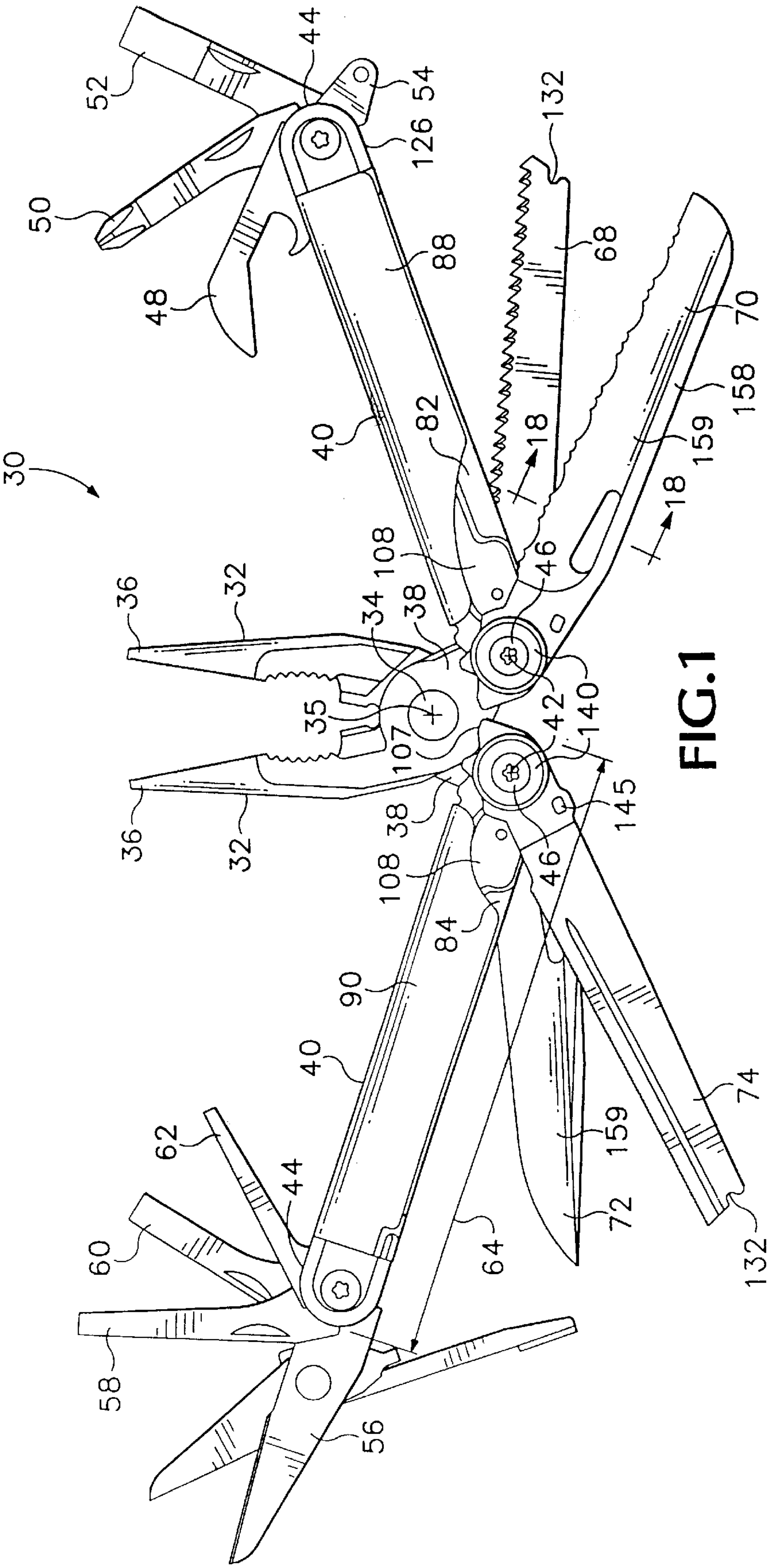
FIG. 1 is a side view of a multipurpose tool according to the present invention showing its several blades and bits each in a partially extended position and the handles in a partially unfolded position so that a pair of pliers jaw included in the tool are in view.

Referring now to the several views of the drawings which form a part of the disclosure herein, in FIG. 1, a multipurpose tool which is one embodiment of the present invention includes a pair of pliers jaws 32 interconnected pivotally with each other at a pivot joint 34 defined by a suitable fastener such as a rivet defining an axis of rotation 35 of the pivot joint 34, about which the pliers jaws 32 pivot with respect to each other.

Figure 2:
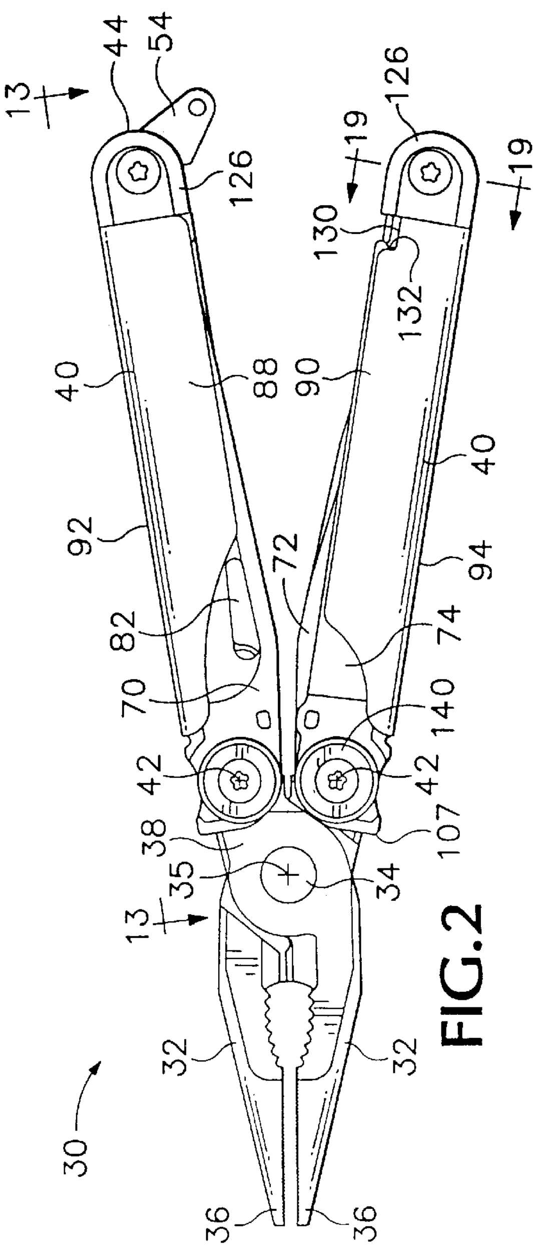
FIG. 2 is a right side view of the multipurpose tool shown in FIG. 1 with the several blades and bits in their respective stowed positions and the handles extended for use of the pliers included as part of the tool.
Figure 4:
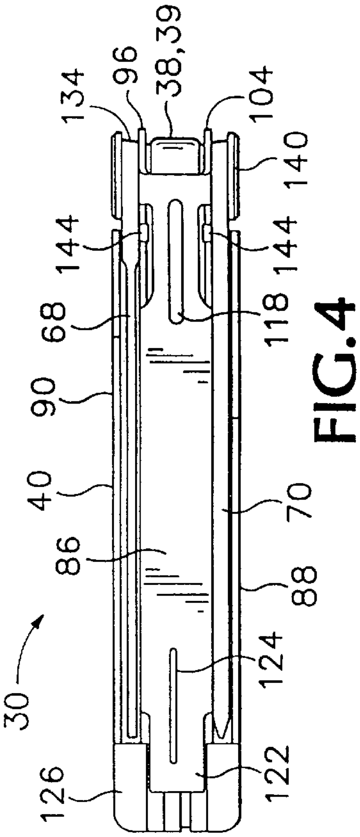
FIG. 4 is a top view of the folded tool shown in FIG. 3.

Each pliers jaw 32 includes a tapered tip 36 and a respective base portion or tang 38 separated from each other by the pivot joint 34. A pair of handles 40 attached to the pliers jaws 32 are substantially similar to each other. The handles 40 are arranged to be movable about respective handle-folding pivot axes 42 parallel with the axis of rotation 35 defined by the pivot joint 34, between extended positions with respect to the pliers jaws 32, as shown in FIG. 2, and a folded configuration of the tool 30, as shown in FIGS. 3–9. Preferably, each tang 38 has a cam surface 39 in the form of a part of a circular cylinder contacted by the respective handle 40 with sufficient pressure to keep the handles 40 from moving too freely about the pivot axes 42.

Several tool bits or blades are mounted on a respective pivot shaft 46 located at an outer end 44 of each handle 40. For example, in one of the handles 40 are a bottle or can opener 48, a modified Phillips-type screwdriver 50, and a largest straight screwdriver blade 52, as well as a lanyard attachment ear 54. At the outer end 44 of the other one of the handles 40 are a pair of folding scissors 56, a small-medium screwdriver 58, a medium screwdriver 60, and a small screwdriver 62. All of the various tool blades and bits mounted at an outer end 44 are shorter than the length 64 of the handles 40, and can be stowed by being folded into stowage positions within a central channel 66 (FIG. 9), still leaving room for the jaws 32 also to be stowed within the central channels 66 when the tool 30 is folded into the configuration shown in FIGS. 3–9.

The multipurpose tool 30 also includes four more tools that for convenience will be referred to as outer blades, each mounted for rotation about a respective one of the pivot axes 42. These tools include, as shown in FIG. 1, a saw blade 68, a sheep's foot knife blade 70 with a scalloped edge, a clip point knife blade 72, and a file 74, although other tools might be provided instead. As the multipurpose tool 30 is shown in FIGS. 2–8, all of the just-mentioned outer blades are stowed, each in a respective side trough 76 or 78. Each handle 40 includes a side trough 76 housing the respective one of the knife blades 70 and 72, as well as an opposite side trough 78 in which either the saw blade 68 or the file 74 can be received. Since the central channel 66 holds the pliers jaws 32 and several blades or bits side-by-side it may be about three times as wide as either of the side troughs 76 or 78.

Figures 9, 10, 11, 12:
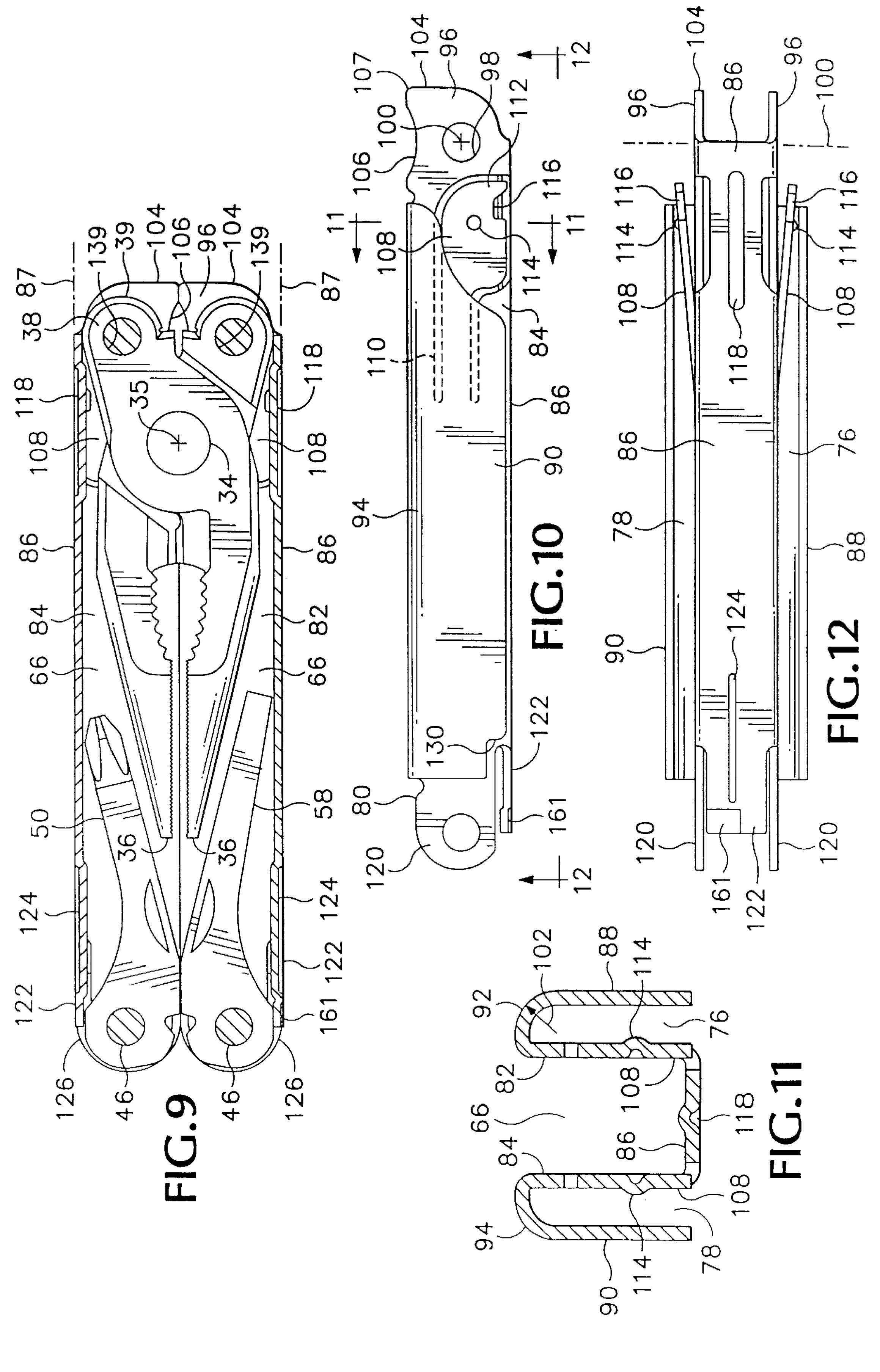
FIG. 9 is a right side view of the tool shown in FIGS. 1–8, at an enlarged scale, partially cut away to show the locations of pliers jaws and screwdriver bits within the central channels of the handle of the tool.
FIG. 10 is a side view of the main element of one of the handles of the tool shown in FIGS. 1–9.
FIG. 11 is a section view taken along line 11—11 of FIG. 10.
FIG. 12 is a view of the handle element shown in FIG. 10, taken in the direction indicated by the line 12—12 in FIG. 10.
Figure 13:
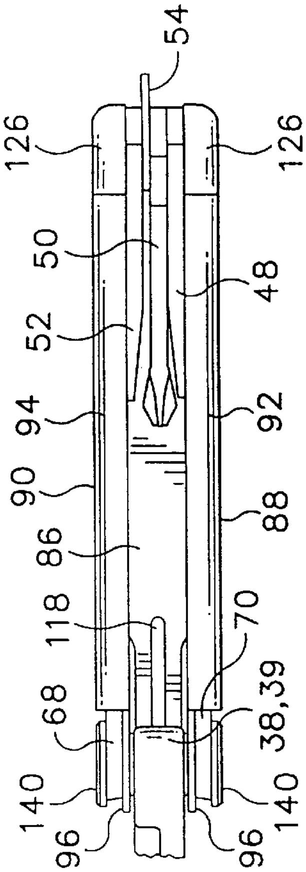
FIG. 13 is a view of the handle portion of the tool shown in FIG. 2, taken along the line 13—13 of FIG. 2.

Referring next in particular to FIGS. 10–13, showing the construction of the handles 40, it will be seen that a principal element 80 of each handle 40 is made from a single sheet of material such as metal which is preferably cut to the required shape when flat and bent thereafter to define the shape of the central channel 66 and each of the side troughs 76 and 78. Preferably, the handles 40 may be made of steel, for example, type 420 stainless steel sheet with a nominal thickness of 0.040 inch (1.02 mm), cut to shape using conventional fine-blanking technology. The blank is bent when soft and is heat treated thereafter to be relatively hard and to provide resiliency for the required spring action. In particular, as shown in FIGS. 10 and 11, the blank 80 is bent parallel with a longitudinal axis of the handles 40 to form the two side troughs 76 and 78 and the central channel 66. The central channel 66 is defined by a pair of parallel channel walls 82 and 84 which are symmetrically opposite and which are interconnected by a channel base 86 which is generally planar, defining a base plane 87. The channel base 86 presses against the cam surface 39 of the associated pliers jaw 32 throughout substantially all of the range of movement of the jaws 32 relative to the handle 42, so that the channel walls 82 and 84 need not be squeezed into contact with the sides of the tang 38 to provide a desired amount of friction between the handle 40 and pliers jaw tang 38.

The side troughs 76 and 78 are defined, respectively, by side wing portions 88 and 90, which extend outward away from the channel walls 82 and 84 and are curved arcuately, extending thence parallel with the channel walls 82 and 84. Preferably, the bases 92 and 94 of the side troughs 76 and 78 have base outer surfaces that each include about one-fourth of a circular cylinder having a radius 102 of at least about 3 mm and preferably about 4 mm, extending along the length of the handle 40. A respective side trough base portion 92 or 94 is thus much wider than the mere thickness of the associated central channel wall 82 or 84, providing a greatly increased surface area on which to press when gripping the extended handles 40 to operate the pliers or other pivotally paired jaws or blades included in such a multipurpose tool.

The wing portions 88 and 90 each extend thence parallel with the channel walls 82 and 84, toward the base plane 87, far enough to protect the respective one of the outer blades 68, 70, 72 and 74, at least about half of the way and, preferably, the entire distance to the base plane 87 in order to provide a more pleasing appearance.

Near a first end of each handle 40, a pair of parallel support flanges 96 are extensions of the central channel walls 82 and 84. The support flanges 96 define oppositely-located pivot pin holes 98 aligned to define a pivot axis 100.

Each flange 96 includes an abutment face 104 substantially perpendicular to a main plane of the flange 96. A concave cutout 106 is provided on one margin of each flange 96 and provides clearance for a corner 107 of the flange 96 of the opposite handle 40, as one of the handles 40 is opened apart from the other or closed toward the other, as in moving between the folded configuration of the tool 30, shown in FIG. 3, and the pliers-use configuration shown in FIG. 2. The cutout 106 also helps define a finger rest for delicate use of the pliers.

Each of the central channel side walls 82 and 84 is cut to define a blade locking member 108 as an integral part of the handle element 80. The blade locking members 108 are mirror images of each other, each including a narrow base portion 110 and a wider outer end portion 112 extending toward the base 86 of the central channel. The base portions 110 are bent so that each blade locking member 108 projects at a slight angle outwardly from parallelism with a respective one of the channel side walls 82 and 84 into the adjacent one of the side troughs 76 and 78, as may be seen best in FIG. 12. A small detent bump 114, formed on each blade locking member 108 by a coining or extruding step, projects laterally outward away from the central channel 66. Each blade locking member defines a notch 116 in its margin facing in the direction of the central channel base portion 86. The base portion 86 of the central channel is stiffened between the blade locking members 108 by a rib 118 formed in the material.

At the opposite end of each handle 40, a pair of flanges 120 extend longitudinally beyond the wing portions 88 and 90, as extensions of the central channel side walls 82 and 84. A spring 122, optionally stiffened by a formed rib 124, extends from the channel base portion 86 between the flanges 120. Respective bolsters 126 shown best in FIGS. 1 and 13 fit on the flanges 120 as part of each handle 40. The bolsters 126 are of suitable hard material such as aluminum or brass, configured to provide a comfortable rounded shape for the outer ends 44 of the handles 40, and are aligned with the ends of the side wings 88 and 90.

When the handles 40 are extended with respect to the pliers jaws into the configuration illustrated in FIG. 2, the outer surfaces of the bases 92 and 94 of the troughs 76 and 78 and the surfaces of the bolsters 126 provide a comfortable grip during use of the pliers. Additionally, surfaces of at least portions of the backs of the several screwdrivers 50, 52, 58, 60 and 62, the scissors 56, and the container opener 48 are also located in a plane tangent to the base outer surfaces of the bases 92 and 94 of the respective handle 40, providing additional area on which to exert pressure in squeezing the handles 40 together while using the pliers.

As may be seen in FIG. 9, the positions of the Phillips screwdriver 50 and the small-medium screwdriver 58, when they are stowed within the respective central channel 66, provide room for the pliers jaw tips 36 to extend along and between portions of those screwdriver blades, which are located centrally of the width of the central channel 66. The screwdriver blades 58 and 50 rotate about the pivot shaft 46 through an angle greater 180° to reach their fully extended positions.

Figure 3:
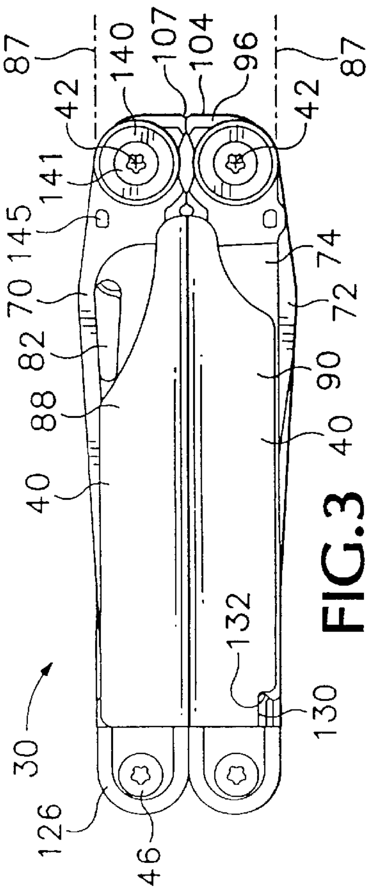
FIG. 3 is a right side view of the multipurpose tool shown in FIGS. 1 and 2 in a completely folded configuration.
Figure 5:
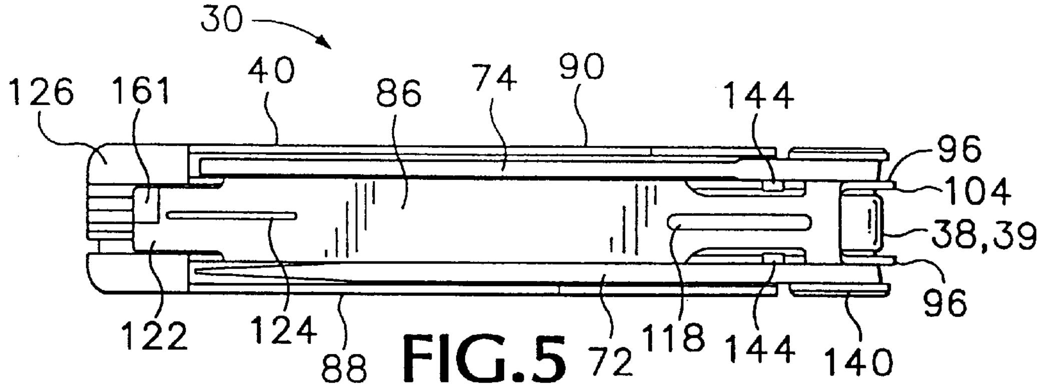
FIG. 5 is a bottom view of the folded tool shown in FIG. 3.
Figure 6:
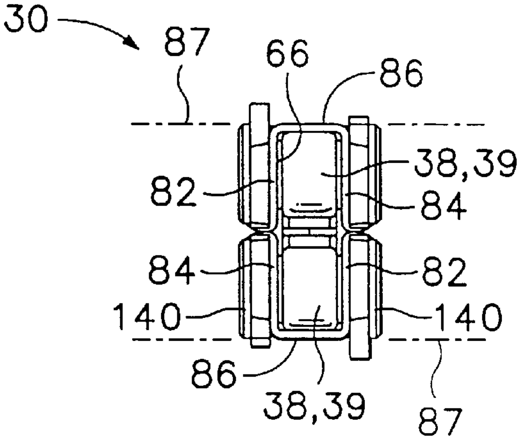
FIG. 6 is a pliers jaw pivot end view of the folded tool shown in FIG. 3.
Figure 7:
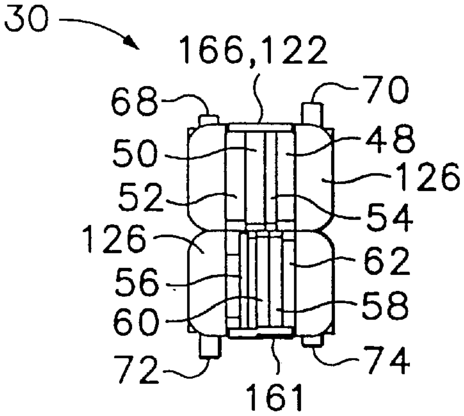
FIG. 7 is a tool bit pivot, or outer, end view of the folded multipurpose tool shown in FIG. 3.
Figure 8:
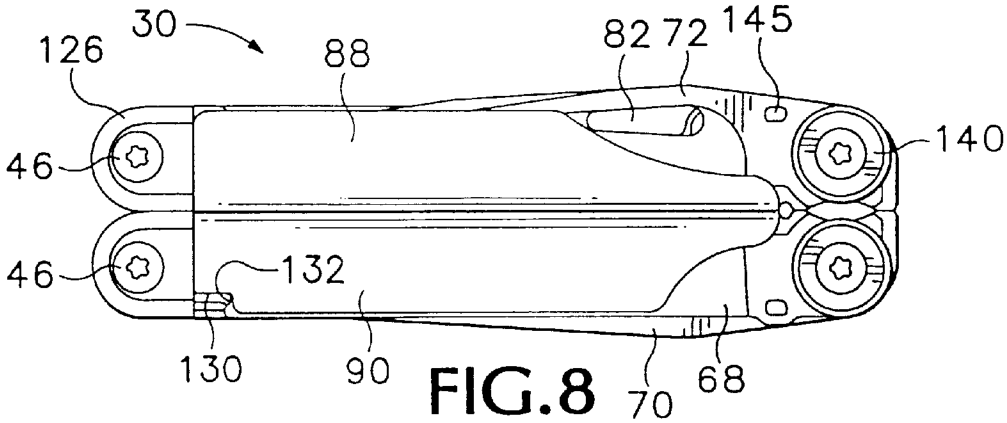
FIG. 8 is a left side view of the folded tool shown in FIG. 3.
Figure 14:
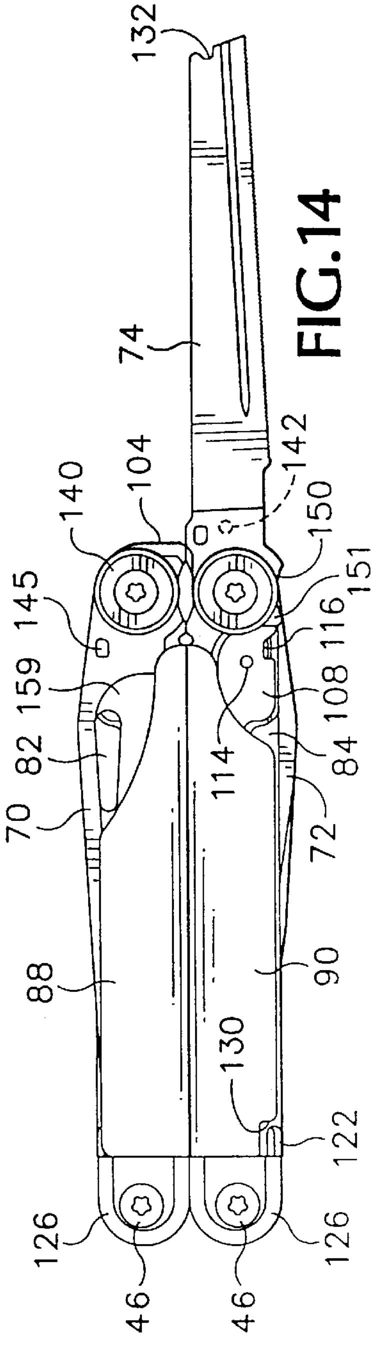
FIG. 14 is a right side view of the tool, similar to FIG. 3 except that the file is shown in its extended position.

Referring next to FIGS. 14,15,16 and 17, the four outer blades located in the side troughs 76 and 78, that is, the saw 68, file 74, or either of the knife blades 70 and 72 can be moved about the respective pivot axis 42 from their stowed positions shown in FIGS. 3 and 8 to a fully opened or extended position such as that of the file 74 as shown in FIG. 14, and without having to disturb any of the other tool bits or blades without the necessity of moving either of the handles 40 with respect to the other from the completely folded configuration of the multipurpose folding tool 30 shown in FIG. 3. Each of these outer blades is held in its extended position by a respective locking mechanism including the blade locking member 108.

An access opening 130 is provided in the side wing 90 of each handle 40 to give access to a notch 132 defined in the outer end of the file 74 and similarly in the outer end of the saw blade 68, to initiate movement of the file 74 or saw blade 68 from its stowed position within the respective one of the side troughs 78.

Each of the four outer blades includes a base or tang portion 134 defining a through hole 136. A blade pivot shaft 138 defining the pivot axis 42 extends transversely of each handle, through the pivot pin holes 98 in the support flanges 96 and through an opening 139 defined through tang 38 of the respective one of the pliers jaws 32 (FIG. 9). Each of a pair of radially extending flange-like outer axial bearings 140 is attached to a respective end of the pivot shaft 138. Each of the saw blades 68, sheeps foot blade 70, clip point blade 72 and file 74 is thus attached to the respective one of the handles 40 and held snugly alongside an adjacent one of the support flanges 96 by the respective axial bearing 140, and can be rotated about the handle pivot shaft 138.

Figure 16:
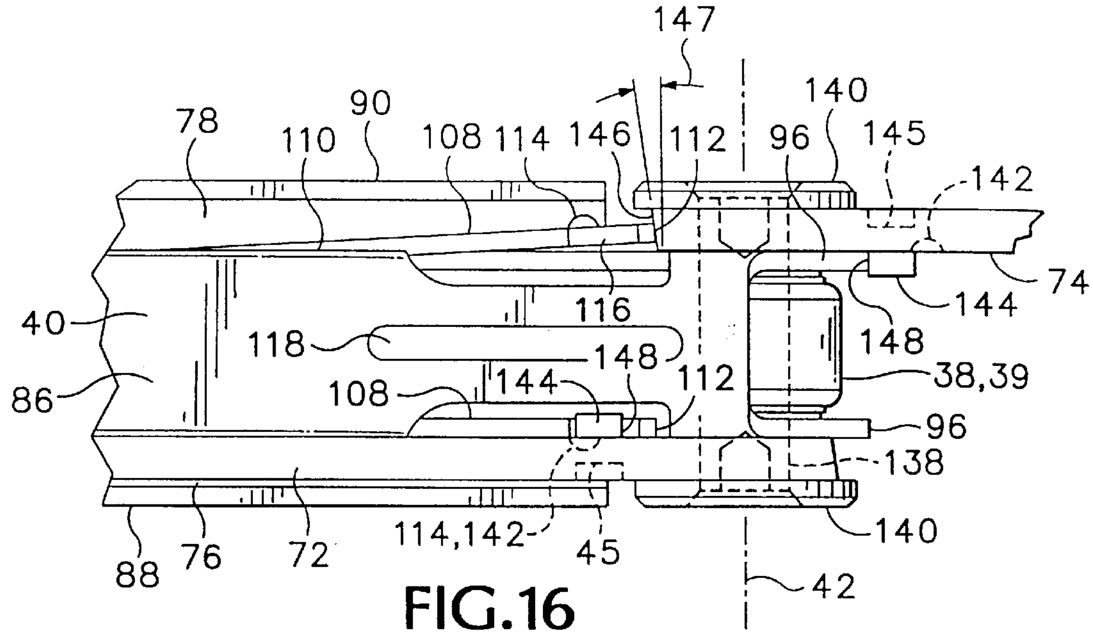
FIG. 16 is a view of the portion of a tool shown in FIG. 15, taken in the direction of the line 16—16.

As may best be seen in FIG. 16, handle pivot shaft 138 has a cylindrical outer surface and may have female threads in each of its opposite ends, to receive corresponding screws 141 to attach each of the axle bearings 140 to a respective end of the shaft 138. Preferably the shaft 138 is no longer than the minimum distance through a pair of opposite outer blades together with the support flanges 96 and associated pliers jaw tang 38. Each of the screws 141 is mated with a respective end of the shaft 138 and adjusted to provide the desired small amount of axial clearance between the bearings 140 and the respective adjacent ones of the outer blades. The screws 141 are retained in such adjusted positions by use of an adhesive interconnecting the threads of the screw 141 and the pivot shaft 138. Alternatively, one end of the pivot shaft 138 may include a bearing 140 as an integral part of the shaft 138, while a bearing 140 may be formed as the head of a screw 141 mated with female threads defined by the other end of the shaft 138.

To keep each of the outer blades in the desired stowed position within its respective one of the side troughs 76 and 78, a dimple 142 is defined in the inwardly facing side of the tang 134 in a position aligned to fit over and engage the corresponding detent bump 114 of the blade locking member 108. The elastic bias of each blade locking member 108 urges the blade locking member 108 toward a respective tang 134 and tends to keep the detent bump 114 engaged within the dimple 142 to retain the respective blade in its stowed position within the respective side trough 76 or 78 until it is intentionally moved.

Each tang 134 also has a lateral projection 144 that extends inwardly toward the central channel 66 of the handle 40. The lateral projection 144 may be formed by a step of coining or extrusion, leaving a cavity 145 on the opposite side of the tang 134, but the lateral projection 144 could also be a pin mounted in a hole in the tang. The lateral projection 144 rests within and snugly against the bottom of the notch 116 when the detent bump 114 is engaged within the dimple 142, thus preventing the particular outer blade from moving too deeply into the side trough 76 or 78.

Figure 15:
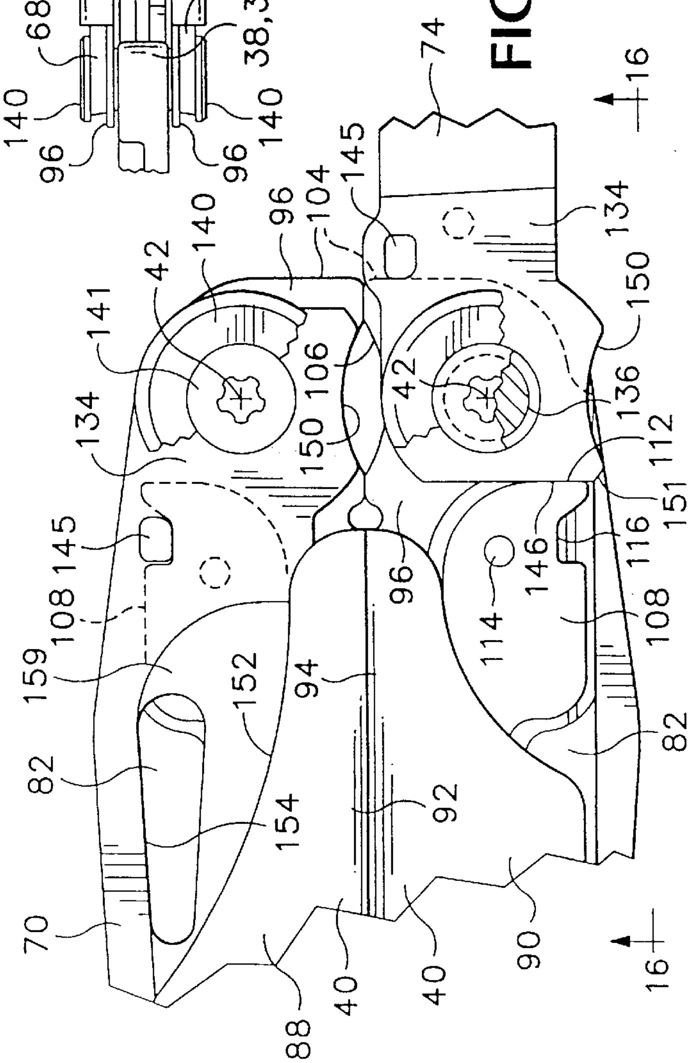
FIG. 15 is a partially cutaway view of a portion of the tool shown in FIG. 14, at an enlarged scale.

When an outer blade such as the file 74 is in the extended position, as shown in FIGS. 15 and 16, the outer end 112 of the blade locking member 108 is urged laterally outward by its elastic bias and engages a locking surface 146 of the tang 134, and a limiting surface 148 of the lateral projection 144, oriented transversely with respect to the length of the outer blade, rests against the abutment portion 104 of the respective support flange 96. The locking surface 146 is oriented at a small angle 147 with respect to a plane perpendicular to the wall 82 or 84 of the central channel, as shown in FIG. 16. The blade locking member 108 thus prevents the file 74 from rotating clockwise as seen in FIG. 15, while the engagement of the limiting surface 148 of the lateral projection 144 against the abutment portion 104 prevents the file from rotating counterclockwise as seen in FIG. 15. Similar engagement of the locking surface 148 of the lateral projection 144 of the tang or base 134 of the saw blade 68 or one of the knife blades 70 or 72 prevents each saw or knife blade from collapsing during use of the cutting edge of the blade. The location of the projection 144 near the back of each outer blade provides a suitably long moment arm about the pivot axis 42 to withstand the expected stresses. Preferably, the axial bearing 140 is large enough radially to overlap the outer end 112 of the adjacent blade locking member 108 to keep it aligned with the locking surface 146 when the adjacent outer blade is in the extended position, despite wear of the outer end 112 or locking surface 146.

Figure 17:
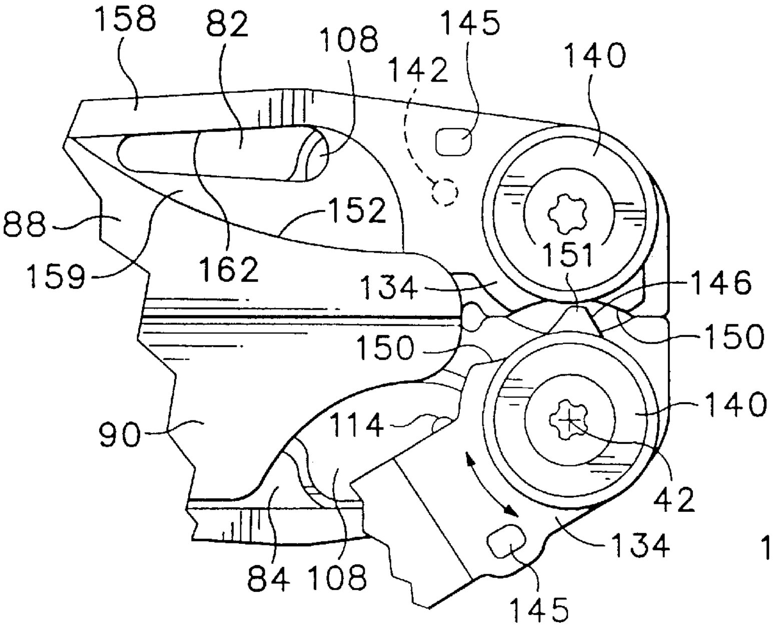
FIG. 17 is a view, at an enlarged scale, of the portion of a tool shown in FIGS. 15 and 16, with the file shown in a position between the closed position shown in FIG. 3 and the extended position shown in FIG. 14.

As may be seen in FIG. 17, each outer blade base or tang 134 overlaps the outer end 112 of the locking member 108. This overlap is present for any position of rotation of the tang 134 about axis 42 except when the respective outer blade 68, 70, 72 or 74 is in or very nearly in its extended position, so that unless engaged by either the locking member 108 or the detent bump 114, each outer blade is free to pivot about the respective axis 42.

Each tang 134 has an arcuately concave front margin 150 that provides clearance, as shown in FIG. 17, for the outer corner 151 of the tang 134 to pass along the concave front margin 150 of the opposite tang 134 as one of the outer tool blades is opened. Since the locking surface 146 extends to the corner 151 it provides a sufficiently long moment arm about the pivot axis 42 to be acted on by the outer end 112 of the blade locking member 108.

Additionally, the concave surface 150 corresponds in shape with the concave surface 106 on each of the support flanges 96 so that the concave surfaces 106 and 150 together provide a comfortable position for placement of a user's fingers, particularly when doing delicate work, with the handles 40 extended for use of the pliers jaws 32.

A selected outer blade such as the file 74 is released from its extended position as shown in FIG. 14 to be returned to its stowed position by exerting sufficient inward pressure against the blade locking member 108 to move the outer end 112 toward the central channel 66 far enough to provide room for the tang 134 to move alongside the outer end 112.

Figure 18:
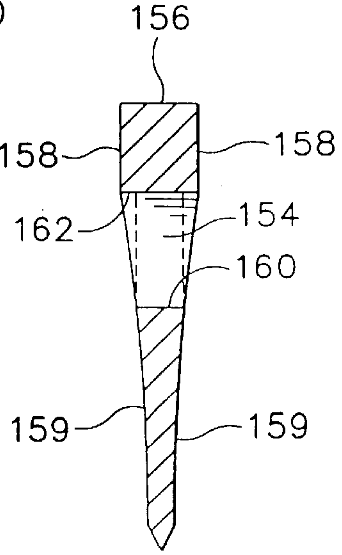
FIG. 18 is a section view of one of the outer blades of the tool, taken along line 18—18 of FIG. 1, at an enlarged scale.

As may be seen clearly in FIGS. 14 and 15, a margin 152 of each side wing 88 is shaped to expose a blade-opening hole 154 defined in each knife blade 70 and 72, so that the hole 154 can be engaged by a user's thumb to move either of the knife blades 70 and 72 from its stowed position within the respective one of the side troughs 76 to an open position. Preferably, as shown in FIG. 18, a back portion 156 of each blade 70 or 72 has a pair of opposite parallel flat faces 158 which extend to a margin of the blade-opening hole 154, while the thickness of the blade is tapered on faces 159 beginning at a margin of the back portion 156, so that the opposite, or inner side 160, of the blade-opening hole 154 is defined by a thinner portion of the blade. As a result, an over-hang portion 162 of an interior surface of the blade-opening hole 154 is exposed to make it easy for a user to engage the blade-opening hole 154.

Figure 19:
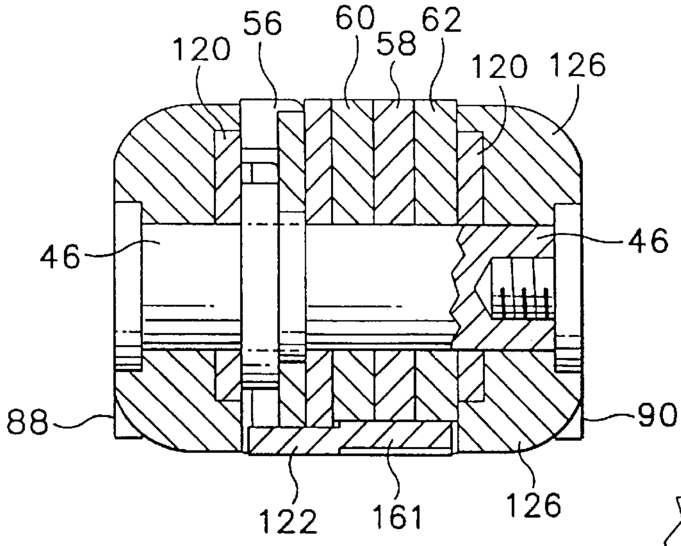
FIG. 19 is a section view, at an enlarged scale, of one of the handles of the tool, together with several tool bits and a folding scissors, all in their stowed positions, taken along line 19—19 of FIG. 2.

At the outer end 44 of each handle, the pivot shaft 46 is of construction similar to that of the handle pivot shaft 138 and retains the bolsters 126 and the several tool bits or blades located at the outer end 44 of the particular one of the handles 40. As shown in FIG. 19, the screwdriver blades 58, 60 and 62 are located between the central channel walls 82 and 84, together with the folding scissors 56 which are essentially similar to the folding scissors disclosed in U.S. Pat. No. 5,745,997, of which the disclosure is hereby incorporated herein by reference.

In order to provide the required interaction between the spring 122 located at the outer end 44 of the handle 40 and the base of the screwdriver blades 58, 60 and 62, while also providing interaction of the spring 122 with the base of the scissors 56, a portion 161 of the spring 122 may be offset slightly inward toward the bases of the screwdriver blades 58,60, and 62 as shown in FIG. 19.

Figure 20:
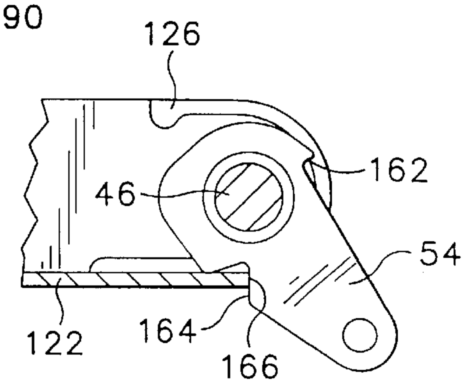
FIG. 20 is a partially cutaway view, at an enlarged scale, of a portion of one handle of the folding tool shown in FIG. 1, together with a lanyard attachment ear.

The lanyard attachment ear 54, as shown in FIG. 20, includes latch surfaces 162 and 164 which interact with the spring 122 of the handle 40 in which it is included in such a way that the lanyard attachment ear 54 remains either extended as shown in FIG. 2 and FIG. 20, or stowed within the handle 40 as shown in FIG. 3, despite opening and closing of the tool bits 48,50, and 52 located on the same pivot shaft 46. The latch surface 162 or 164 remains engaged with spring 122 as the tip 166 of the spring 122 is moved by the cams of the bases of the tool bits 48, 50, and 52 during most of the range of movement of any of them in opening and closing. The lanyard ear thus remains in or conveniently close to the desired location despite movement of the tool bits.

Figure 21:
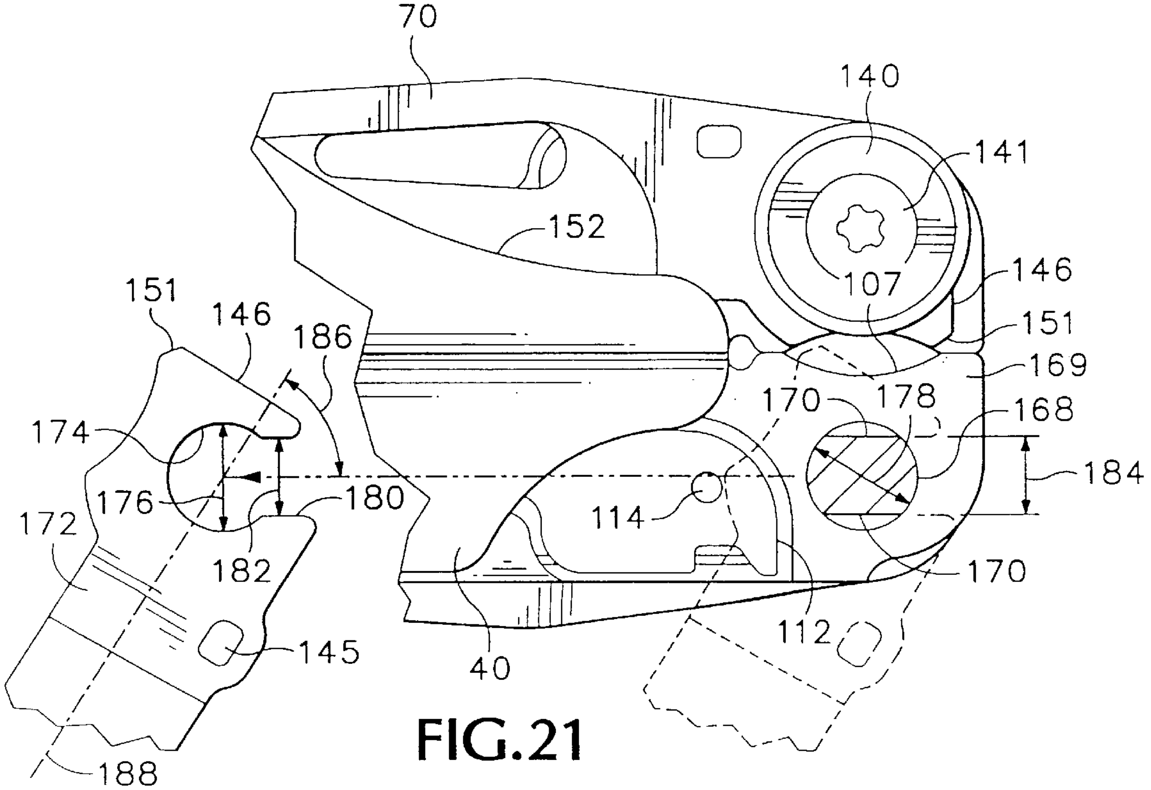
FIG. 21 is a partially cutaway view of portions of a tool which is an alternative embodiment of the present invention, in a folded configuration and showing the manner of attachment of one or more removable outer blades.

As an optional embodiment of the present invention, shown in FIG. 21, a file blade 74 or saw blade 68 may be made to be removed easily from the multipurpose folding tool 30 for replacement after extended use. Such removal is made possible by incorporation of a blade pivot shaft 168 having a pair parallel flat surfaces 170. Preferably, a hole of corresponding shape in the support flange 169 of the tool handle 40', otherwise similar to the previously described handles 40, prevents the shaft 168 from rotating. A tang 172 of such a removable saw blade, file, or other blade includes a pivot opening 174 of generally circular configuration having a diameter 176 equal to the diameter 178 of the shaft 168, and has a mouth 180 extending radially from the pivot opening 174. The mouth 180 has a width 182 slightly greater than the separation 184 between the flat surfaces 170 of the handle pivot shaft 168, and oriented at an angle 186 with respect to a longitudinal axis 188 of the saw blade or file. The angle 186 is preferably about 55°, so that the mouth 180 is not aligned with the flat surfaces 170 when the file or saw blade is in either its extended or its stowed position. This alignment allows the mouth 180 to slide along the flat surfaces 170 to permit the tang 172 to be removed from the handle pivot shaft 168, however, when the longitudinal axis 188 of the file or saw blade is oriented at a corresponding oblique angle with respect to the handle 40. As a result, saw and file blades 68 and 74 can be replaced easily when worn out. Preferably, the axial bearing 140 associated with the blade pivot shaft 168 is large enough to overlap the outer end 112 of the adjacent blade locking member 108 to prevent it from moving too far laterally when the saw 68 or file 74 has been removed.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A handle for a multipurpose hand tool, comprising:

(a) a unitary main member having a length and first and second ends defining an elongate central channel having a pair of parallel channel walls interconnected by a channel base, and a pair of side wing portions each defining a side trough extending along a respective one of said channel walls outside said central channel, said central channel facing openly in a first direction and each side trough facing openly in an opposite second direction;

(b) a pair of oppositely located support flanges each defined as a part of a respective one of said channel walls adjacent said first end, each of said support flanges defining a through-hole, said through-holes defining a pivot axis extending transversely through said handle adjacent said first end; and (c) a blade locking member defined as an integral part of one of said channel walls.

2. The handle of claim 1 wherein said main member is of sheet metal.

3. The handle of claim 2, including a pair of bolsters each attached to a respective one of said channel walls adjacent said second end of said handle.

4. The handle of claim 1 wherein said blade locking member includes a spring leg and a locking face, said locking face extending transversely with respect to said spring leg and being offset from said spring leg in a direction toward said channel base of said central channel.

5. The handle of claim 1, including a pair of said blade locking members, each defined by a respective one of said channel walls.

6. The handle of claim 1 wherein said central channel and each of said side troughs has a respective width, said width of said central channel being about three times as great as said width of each of said side troughs.

7. The handle of claim 1 wherein each of said side troughs has a base outer surface available as a hand grip surface.

8. The handle of claim 1 wherein each of said side troughs has a convexly arcuate base outer surface including about one fourth of a circular cylinder having a radius of at least about 3 mm and extending along a majority of said length of said main member.

9. The handle of claim 1, a portion of a side wing portion of at least one of said side troughs having a shape giving easy access to said blade locking member and exposing said support flange.

10. The handle of claim 1, each of said side wing portions extending to a base plane defined by said channel base of said central channel.

11. The handle of claim 1, a portion of each of said side wing portions extending parallel with said respective one of said channel walls for a distance toward a base plane defined by said channel base of said central channel.

12. The handle of claim 1, including a spring extending from said channel base and located adjacent said second end, said spring including a stiffening rib.

* * * * *